United States Patent
Shah et al.

(10) Patent No.: US 12,210,163 B2
(45) Date of Patent: Jan. 28, 2025

(54) ELECTRONIC DEVICES WITH OPTICAL COMPONENT PROTECTION

(71) Applicant: Apple Inc., Cupertino, CA (US)

(72) Inventors: Ritu Shah, Sunnyvale, CA (US); Forrest C. Wang, Petaluma, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/351,187

(22) Filed: Jul. 12, 2023

(65) Prior Publication Data
US 2023/0359048 A1    Nov. 9, 2023

Related U.S. Application Data

(62) Division of application No. 17/401,130, filed on Aug. 12, 2021, now Pat. No. 11,747,632.

(60) Provisional application No. 63/076,830, filed on Sep. 10, 2020.

(51) Int. Cl.
*G02B 27/01*    (2006.01)
*G06F 1/16*    (2006.01)
*G06F 3/0362*    (2013.01)

(52) U.S. Cl.
CPC ..... *G02B 27/0176* (2013.01); *G02B 27/0101* (2013.01); *G02B 27/0172* (2013.01); *G02B 2027/0154* (2013.01)

(58) Field of Classification Search
CPC ................ G02B 2027/0178; G02B 27/017
See application file for complete search history.

(56) References Cited

U.S. PATENT DOCUMENTS

| | | | |
|---|---|---|---|
| 4,441,799 A | 4/1984 | Enomoto | |
| 6,168,278 B1* | 1/2001 | Mukai | A61F 9/025 351/158 |
| 7,657,174 B2 | 2/2010 | Arai | |
| 8,425,243 B2 | 4/2013 | Alvarez Rivera | |
| 2002/0089601 A1 | 7/2002 | Fumio et al. | |
| 2003/0013483 A1 | 1/2003 | Ausems et al. | |
| 2007/0269202 A1 | 11/2007 | Forsyth-Martinez et al. | |
| 2014/0028629 A1* | 1/2014 | Drumm | G06F 3/0421 345/175 |
| 2014/0267401 A1 | 9/2014 | Urbach | |
| 2016/0066438 A1 | 3/2016 | Malek et al. | |
| 2016/0314468 A1 | 10/2016 | Smith et al. | |
| 2017/0351098 A1* | 12/2017 | Osterhout | G02B 27/0176 |

(Continued)

*Primary Examiner* — Nan-Ying Yang
(74) *Attorney, Agent, or Firm* — Treyz Law Group, P.C.; Tianyi He

(57) ABSTRACT

A head-mounted device may have a head-mounted housing. The head-mounted housing may have rear-facing displays that display images for a user. The images are viewable from eye boxes while the head-mounted device is being worn by the user. A publicly viewable front-facing display may be mounted on a front face of the head-mounted housing. A display cover layer may overlap a pixel array associated with the front-facing display. An inactive border area of the display cover layer may overlap optical components. Shutter systems may be provided between the display cover layer and the optical components to selectively block light. Actuators may move shutter members or other movable members to cover and uncover the optical components. A removable cover may be used to protect the display cover layer and may have portions in different areas that have different optical properties.

16 Claims, 8 Drawing Sheets

(56) References Cited

U.S. PATENT DOCUMENTS

2020/0257182 A1\* 8/2020 Takahashi ............ H04N 23/667
2021/0373602 A1\* 12/2021 Min ........................ H04M 1/21

\* cited by examiner

ELECTRONIC DEVICES WITH OPTICAL COMPONENT PROTECTION

This application is a division of U.S. non-provisional patent application Ser. No. 17/401,130, filed Aug. 12, 2021, which claims the benefit of U.S. provisional patent application No. 63/076,830, filed Sep. 10, 2020. The disclosures of these two applications are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

An electronic device such as a head-mounted device may include displays for displaying visual content for a user. A head-mounted support structure may be used to support rear-facing displays. The rear-facing displays may display left and right images that are viewable through respective left and right lenses from eye boxes located at the rear of the head-mounted support structure. A forward-facing (front-facing) display may be mounted on a front face of the head-mounted support structure and may face away from the rear-facing displays.

A display cover layer may overlap a pixel array associated with the forward-facing display. In an inactive border area of the forward-facing display, the display cover layer may overlap optical components. The optical components may include visible and infrared cameras and other devices that sense and/or emit light.

Shutter systems may be provided between the display cover layer and the optical components to selectively block light. Actuators may move shutter members to cover and uncover the optical components. If desired, filters, ancillary lenses that change the lens powers of lenses associated with cameras or other optical components and/or other optical structures may be moved into and out of place with actuators. A removable cover may be used to protect the display cover layer. The removeable cover may be formed from a polymer layer or other cover layer having portions in different areas that have different optical properties. The removable cover may, for example, have a clear area that covers the active area of the forward-facing display and may have a visible-light-blocking-and-infrared-light-transmitting portion that covers the optical components under the border of the display cover layer.

DETAILED DESCRIPTION

Head-mounted devices include head-mounted support structures that allow the devices to be worn on the heads of users. Displays may be used for presenting a user with visual content. A head-mounted device may have rear-facing displays that display images to the user while the head-mounted device is being worn. The head-mounted device may also have a publicly viewable front-facing display. Optical components such as visible and infrared cameras may be used to gather information about the environment surrounding the head-mounted device. These optical components may include two-dimensional cameras that capture two-dimensional images and three-dimensional cameras that capture three-dimensional images. In some configurations, the optical components may include light-emitting diodes or other light sources that are used to provide illumination for objects in the environment surrounding a head-mounted device and/or the optical components may include other light sensors (e.g., ambient light sensors, optical proximity sensors, etc.).

To help prevent damage to components in a head-mounted device, the head-mounted device may be provided with protection structures such as a removable cover, optical component shutters, and/or other structures that can be used to cover and protect device components. As an example, a publicly viewable front-facing display may be provided with a removable cover. As another example, optical components such as cameras and light sources may be provided with shutters.

Figure 1:
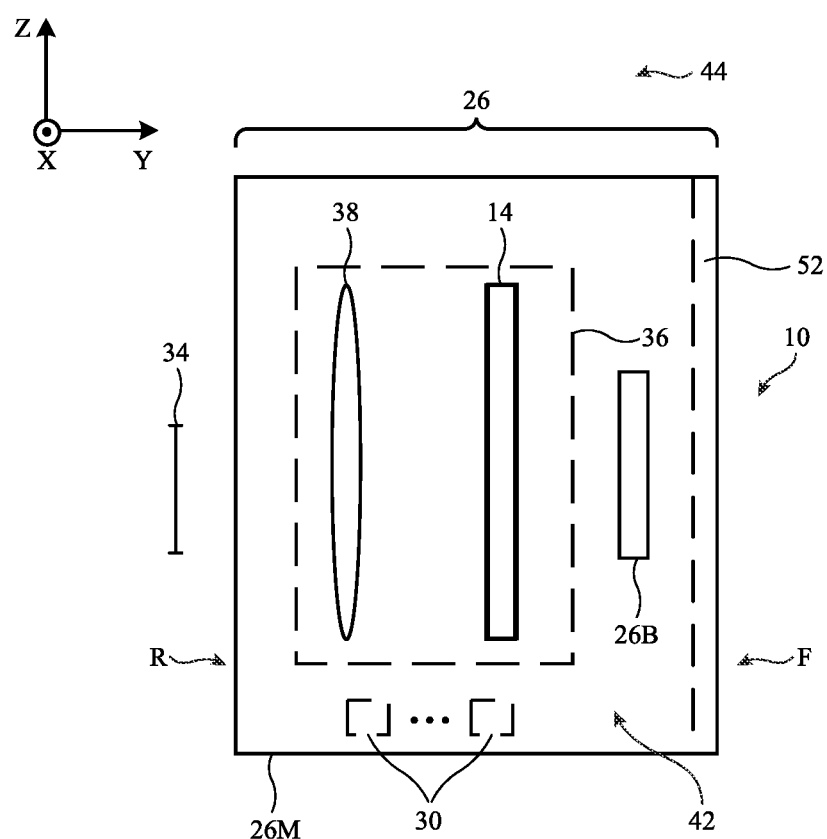
FIG. 1 is a side view of an illustrative electronic device such as a head-mounted device in accordance with an embodiment.

FIG. 1 is a side view of an illustrative head-mounted electronic device. As shown in FIG. 1, head-mounted device 10 may include head-mounted support structure 26. Support structure 26, which may sometimes be referred to as a housing or enclosure, may have walls or other structures that separate an interior region of device 10 such as interior region 42 from an exterior region surrounding device 10 such as exterior region 44. Electrical components 30 (e.g., integrated circuits, sensors, control circuitry, input-output devices, etc.) may be mounted on printed circuits and/or other structures within device 10 (e.g., in interior region 42).

To present a user with images for viewing from eye boxes such as eye box 34, device 10 may include displays such as display 14 and lenses such as lens 38. These components may be mounted in optical modules such as optical module 36 (e.g., a lens barrel) to form respective left and right optical systems. There may be, for example, a left display for presenting an image through a left lens to a user's left eye in a left eye box and a right display for presenting an image to a user's right eye in a right eye box. The user's eyes are located in eye boxes 34 when rear face R of structure 26 rests against the outer surface of the user's face.

Support structure 26 may include a main housing support structure such as portion 26M. Main housing portion 26M may have a portion on front face F of device 10. A forward-facing publicly viewable display such as display 52 may be mounted on front face F of portion 26M. Display 52 may face away from rear-facing displays 14. Display 52 may lie generally in the X-Z plane of FIG. 1. If desired display 52 may have a curved cross-sectional profile. For example, display 52 and front face F of device 10 may curve slightly about the Z axis of FIG. 1 to accommodate the curved shape of the user's face. If desired, support structure 26 may include optional head straps (sometimes referred to as headbands) such as strap 26B and/or other head-mounted support structures that are configured to extend around the head of the user to help support device 10 on the head of the user during use.

Figure 2:
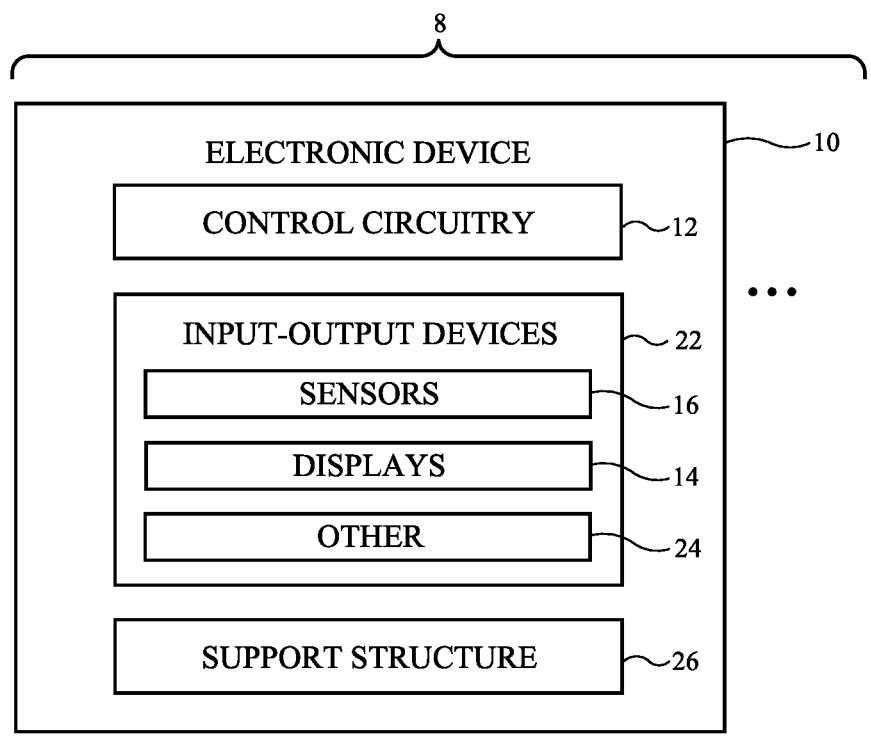
FIG. 2 is schematic diagram of an illustrative system with an electronic device in accordance with an embodiment.

A schematic diagram of an illustrative system that may include a head-mounted device is shown in FIG. 2. As shown in FIG. 2, system 8 may have one or more electronic devices such as device 10. The electronic devices in system 8 may include a head-mounted device (e.g., device 10 of FIG. 1), accessories such as headphones, associated computing equipment (e.g., a cellular telephone, tablet computer, laptop computer, desktop computer, and/or remote computing equipment that supplies content to a head-mounted device), and/or other devices that communicate with the head-mounted device.

Each electronic device if system 8 may have control circuitry 12. Control circuitry 12 may include storage and processing circuitry for controlling the operation of the electronic device. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for the electronic device (e.g., data gathering operations, operations involving the adjustment of the components of the device using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

To support interactions with external equipment, control circuitry 12 may be used in implementing communications protocols. Communications protocols that may be implemented using control circuitry 12 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, multiple-input and multiple-output (MIMO) protocols, antenna diversity protocols, satellite navigation system protocols such as global positioning system (GPS) protocols and global navigation satellite system (GLONASS) protocols, IEEE 802.15.4 ultra-wideband communications protocols or other ultra-wideband communications protocols, etc. Each communications protocol may be associated with a corresponding radio access technology (RAT) that specifies the physical connection methodology used in implementing the protocol.

During operation, the communications circuitry of each electronic device in system 8 (e.g., the communications circuitry of control circuitry 12) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by an electronic device from external equipment (e.g., a tethered computer, a portable device such as a handheld device or laptop computer, online computing equipment such as a remote server or other remote computing equipment, or other electrical equipment) and/or to provide data to external equipment.

Each electronic device in system 8 may include input-output devices 22. Input-output devices 22 may be used to allow a user to provide device 10 with user input. Input-output devices 22 may also be used to gather information on the environment in which device in system 8 is operating. Output components in devices 22 may allow an electronic device in system 8 to provide a user with output and may be used to communicate with external electrical equipment.

As shown in FIG. 2, input-output devices 22 may include one or more displays such as displays 14. In some configurations, an electronic device in system 8 such as device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional light detection and ranging sensors, sometimes referred to as lidar sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources (e.g., infrared light-emitting diodes and/or visible light-emitting diodes), speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have head-mounted support structures such as head-mounted support structure 26 (e.g., head-mounted housing structures such as housing walls, straps, etc.). The head-mounted support structure may be configured to be worn on a head of a user (e.g., against the user's face covering the user's eyes) during operation of device 10 and may support displays 14, sensors 16, other components 24, other input-output devices 22, and control circuitry 12 (see, e.g., components 30 and optical module 36 of FIG. 1).

Figure 3:
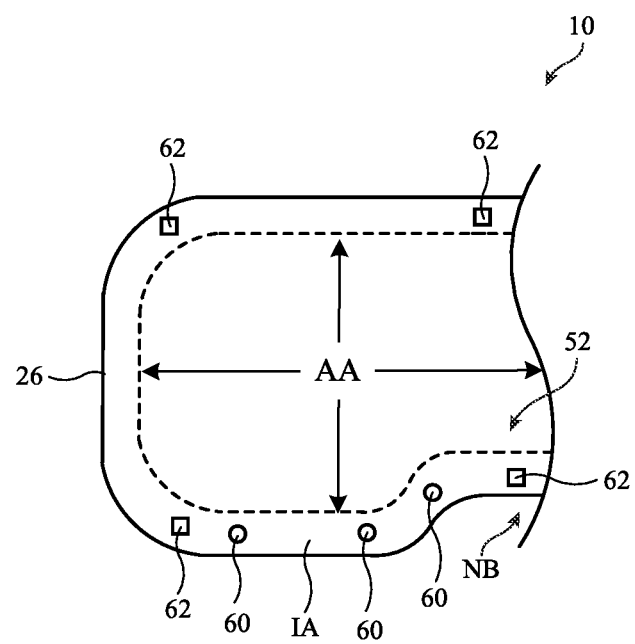
FIG. 3 is a front view of a portion of an electronic device in accordance with an embodiment.

FIG. 3 is a front view of device 10 in an illustrative configuration in which device 10 has a front-facing display. As shown in FIG. 3, display 52 may have an active area AA that contains an array of pixels (e.g., a display panel such as an organic light-emitting diode display panel or liquid crystal display panel) configured to display images. These images may be viewed by people in the vicinity of the user of device 10 when the user of device 10 is wearing and operating device 10 on the user's head. An image displayed in active area AA of display 52 may also be viewed by the user of device 10 when device 10 has been removed from the user's head. If desired, display 52 may be a touch sensitive display (e.g., display 52 may be covered with a two-dimensional touch sensor). Display 52 may have a rectangular shape, a rectangular shape with rounded corners, a shape with a bend to accommodate a user's nose (see, e.g., the curved shape of the edge of display 52 at nose bridge portion NB, which corresponds to a curved nose-bridge portion of support structure 26 that is configured to rest on a user's nose), or may have other suitable shapes.

Some or all of the peripheral edge of display 52 may be free of pixels. For example, display 52 may be surrounded by an inactive border such as inactive area IA of FIG. 3. Inactive border areas such as inactive area IA may be provided with opaque masking structures that help hide internal components from view. If desired, one or more window openings may be formed in the opaque masking structures to accommodate optical components 60 that are aligned with the windows. Optical components 60 may include two-dimensional cameras and/or three-dimensional cameras such as structured light three-dimensional cameras and may operate at visible and/or infrared wavelengths. Cameras may serve to capture visible light images (e.g., one or more forward-facing visible light cameras may capture images that can be merged with computer-generated content on displays 14). Cameras can also form parts of visual inertial odometry systems, may be used to detect the three-dimensional shapes of objects in the user's environment for use with mixed reality applications, and/or may otherwise be used in capturing images of the user's surroundings. Optical components 60 may include light sources operating at visible and/or infrared wavelengths. The light sources may be formed from light-emitting diodes, lasers, and/or other light-emitting devices. If desired, optical components 60 may include sensors 16 that emit and/or detect light such as proximity sensors, ambient light sensors, etc.).

To protect the circuitry of display 52, display 52 may have a protective display cover layer formed from transparent glass, polymer, crystalline material such as sapphire, other transparent material, and/or combinations of these materials. The display cover layer may cover active area AA and inactive area IA. In inactive area IA, the underside (inner surface) of the display cover layer may be coated with a layer of black ink and/or other materials that form an opaque masking layer. This opaque masking structure may cover and hide printed circuits, support structures, component packages, and/or other internal device structures from view.

Circular openings and/or openings of other shapes may be formed in the black ink layer or other opaque masking layer formed on the inner surface of the display cover layer to form windows for respective optical components 60. There may be any suitable number of optical components 60 mounted under inactive area IA in alignment with corresponding opaque masking layer window openings (e.g., at least one, at least two, at least three, at least five, at least six, at least ten, fewer than 12, fewer than eight, etc.). Components 60 may be formed at the lower edge of display 52, along the left and/or right vertically extending side edges of display 52, on the upper edge of display 52, and/or at two or more of these locations.

To facilitate attachment of a protective cover for display 52, display 52 may be provided with attachment structures 62. Structures 62 may include magnets, mechanical attachments structures such as clips or snaps that are configured to engage with mating engagement features in a removable cover, may include hook and loop fasteners, may include structures configured to make press fit connections, may include adhesive, may include threaded structures such as threaded fasteners (e.g., screws and/or other fasteners), and/or may include other structures for removably attaching the protective cover over some or all of display 52 (e.g., over some or all of active area AA and/or some or all of inactive area IA). Structures 62 may be located under the opaque masking layer that is formed along the border of display 52 in inactive area IA and/or may be mounted in other portions of device 10 (e.g., under active area AA, on sidewall portions of support structure 26, etc.).

It may be desirable to block external light from reaching optical components 60. For example, it may be desirable to block external light to help prevent any possible risk of light-induced component damage due to excessive sun exposure and/or to help block components 60 from view from the exterior of device 10 when not in use. Electrically adjustable shutters (e.g., liquid crystal shutters) and/or mechanically adjustable shutters (which are sometimes described herein as an example) may be used to selectively cover components 60. The shutters may be controlled by control circuitry 12 (e.g., based on the operating mode of device 10 such as whether components 60 are active or inactive, based on whether device 10 is powered on or is off or in a low-power sleep mode, based on whether a user has supplied a shutter closing command via input-output devices 22, and/or based on satisfaction of other suitable shutter adjustment criteria).

Figure 4:
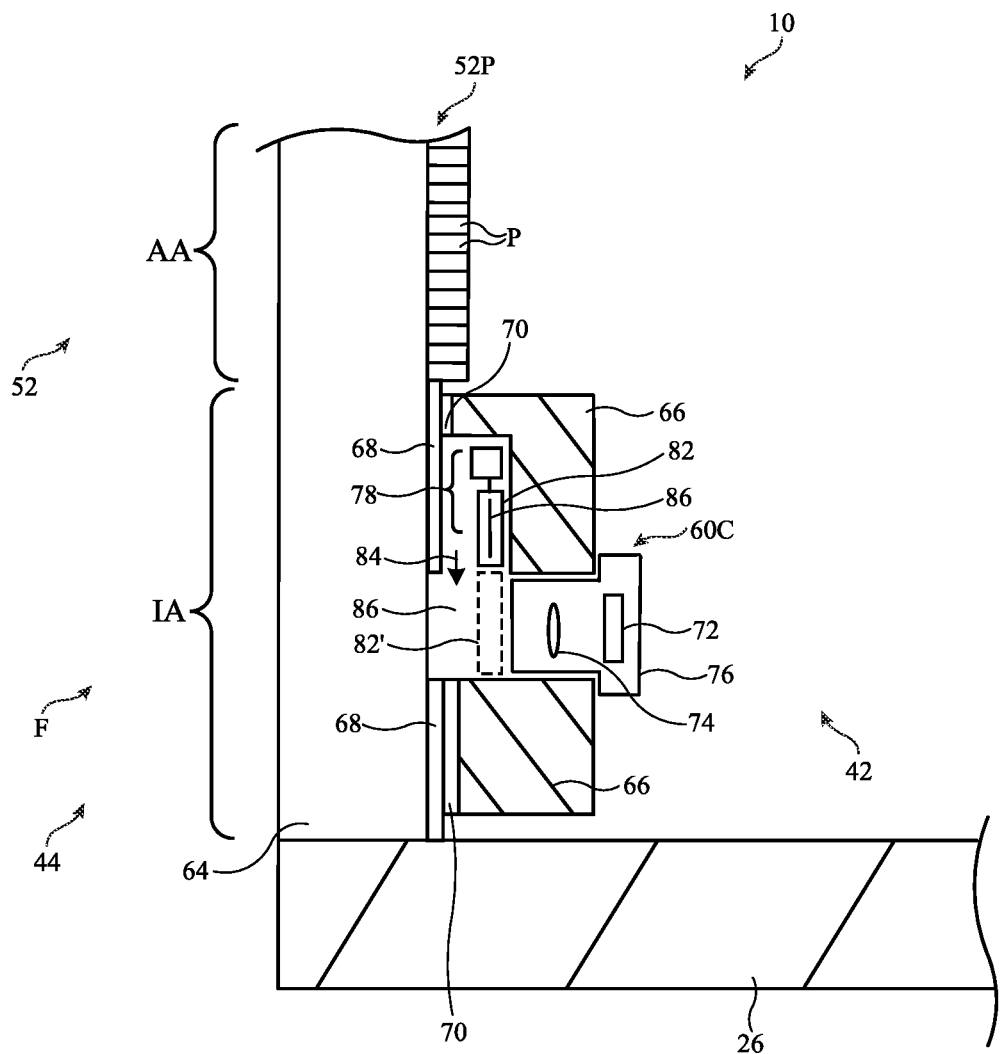
FIG. 4 is a side view of a portion of an electronic device with an optical component shutter in accordance with an embodiment.

FIG. 4 is a cross-sectional side view of an illustrative electronic device of the type that may be provided with one or more optical component shutters. As shown in FIG. 4, display 52 may have a display panel such as display panel 52P with an array of pixels P. Display panel 52P may be used in displaying images in active area AA of display 52 on front face F of device 10.

Display 52 may have a display cover layer such as display cover layer 64. Display cover layer 64 may cover active area AA and inactive area IA of display 52. To hide device structures in interior region 42 from view from exterior region 44, opaque masking layer 68 may be formed on the inner surface of display cover layer 64 in inactive area IA. Adhesive 70 or other attachment structures may be used in attaching interior optical component support structure 66 to the inner surface of display cover layer 64 (e.g., adhesive 70 may be interposed between layer 68 and opposing surfaces of structure 66). Structure 66, which may sometimes be referred to as a shroud, may be formed from black polymer or other suitable materials. Openings may be formed in structure 66 to receive optical components 60. For example, structure 66 may have an opening that receives optical component 60C.

Component 60C in the example of FIG. 4 is a camera having a digital image sensor 72 and corresponding lens 74 mounted in a camera housing such as camera package 76. Other optical components may also be mounted in openings in structure 66, if desired.

The opening in structure 66 that receives camera 60C (or other optical component 60) may be selectively covered or uncovered by a shutter. As shown in FIG. 4, shutter system 78 may be located in air gap 86 between the inner surface of display cover layer 64 and an optical component such as camera 60C.

In the illustrative arrangement of FIG. 4, shutter system 78 includes movable shutter member 86. Shutter system 78 may also have an actuator such as actuator 80. Actuator 80 may be an electromagnetic device (e.g., a solenoid, motor, etc.) and/or other electrically adjustable positioning system. Actuator 80 may be electrically controlled by control signals from control circuitry 12. When it is desired to open the shutter system, actuator 80 may move shutter member 86 away from the opening in support structure 66. In the open shutter state, optical components can operate. For example, camera 60C may capture images through the aligned window opening in opaque masking layer 68 while the shutter is open. When it is desired to close the shutter system to cover the opening in structure 66 and camera 60C, actuator 80 may be used to move shutter member 86 in direction 84 into closed shutter position 82'. To block light, shutter member 82 may be formed from one or more opaque materials (e.g., opaque polymer, metal, etc.).

If desired, a movable member such as member 82 may be provided with an opening that is filled with an optical component such as optional optical component 86. In this type of arrangement, component 86 may not serve as a shutter but rather may serve as a supplemental optical component that can be selectively switched into place to adjust the performance of the aligned optical component supported by structure 66 (e.g., camera 60C or other optical component 60). Component 86 may be, for example, an optical filter such as a band-stop filter, infrared cut filter, a visible-light-blocking-and-infrared-light-transmitting filter, a bandpass filter, a colored filter (e.g., a red filter or blue filter), or other spectral filter. Filters may be formed from thin-film interference filter structures (e.g., dielectric tacks with layers of alternating high and low refractive indices) and/or may be formed from dyes and/or pigments. In some configurations, component 86 may be a supplemental lens (e.g. a lens element that converts lens 74 into a telephoto lens or a wide angle lens by operating in conjunction with lens 74 and thereby adjusting the lens power of camera 60C). Arrangements in which optional component 86 includes other optical structures (polarizer layers, diffuser layers, other optical films, combinations of any two or more of these components, etc.) may also be used. If desired, both an adjustable shutter system and a system with a component such as component 86 on a movable member that can be selectively moved into or out of alignment with an optical component 60 may be used in device 10 (e.g., both of these systems may be mounted in front of the optical component in series). Systems such as these may also be included in removable covers.

Figure 5:
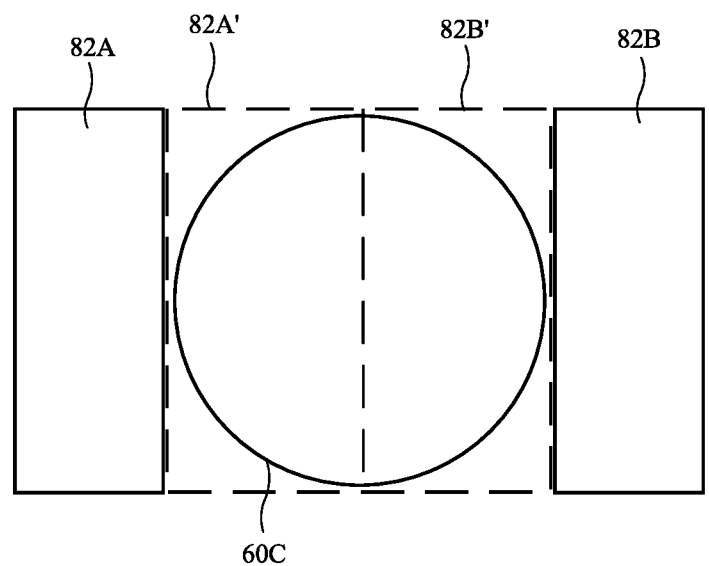
FIG. 5 is a front view of an illustrative optical component and associated shutter in accordance with an embodiment.

The actuator of shutter system 78 may move one or more shutter members such as member 82 by sliding member 82 laterally parallel to front face F, by rotating member 82 into and out of place, by flipping member 82 about an axis that lies in the plane of front face F, and/or by otherwise moving member 82 to cover and uncover an associated optical component such as camera 60C. As shown in FIG. 5, the shutter(s) of device 10 may have multiple moving members (e.g., shutter members 82A and 82B may be moved into closed positions 82A' and 82B' to close the shutter or may be retracted to the positions shown in FIG. 5 to open the shutter). A single actuator that is coupled to both sliding members or multiple actuators may be used in opening and closing the shutter of FIG. 5. If desired, shutter systems may be based on leaf shutters having a circular shape with synchronized set of blades (leaves) that are operated by a corresponding actuator. The examples of FIGS. 4 and 5 are illustrative.

Figure 6:
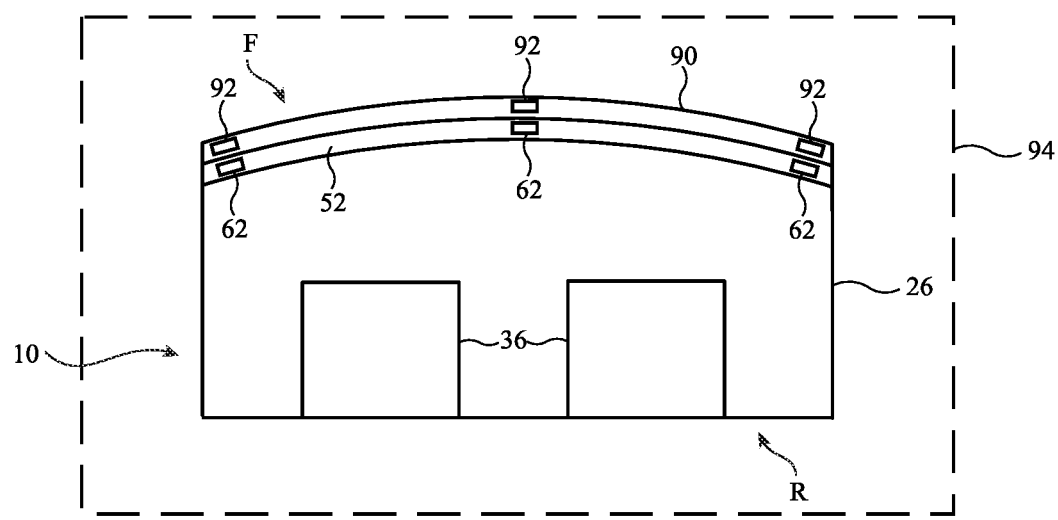
FIG. 6 is a top view of an illustrative electronic device with a removable cover in accordance with an embodiment.

If desired, device 10 may be provided with a removable cover. As shown in the top view of device 10 of FIG. 6, for example, display 52 may be provided with a removable cover such as cover 90. Cover 90 may have a size and shape that is configure to cover some or all of display cover layer 64 of display 52. In some configurations, display cover layer 64 may have an outer surface with a curved cross-sectional profile (see, e.g., display 52 of FIG. 6). Cover 90 may be provided with an inner surface and/or an overall shape that has a mating curved cross-sectional profile.

Cover 90 may be formed from a cover layer containing rigid and/or flexible materials. As an example, cover 90 may be formed from a layer of rigid polymer and/or may be formed from a layer of an elastomeric polymer such as silicone. Fabric and other materials may also be used in forming part of a cover layer for cover 90. In some configurations, cover 90 may be provided with magnets 92 or other attachment structures that are attracted to corresponding attachment structurers 62 (e.g., magnets) in device 10 to hold cover 90 over display cover layer 64 and display 52. If desired, the outer surface of display cover layer 64 and the inner surface of cover 90 may have one or more areas with compound curvature. Cover 90 may be deployed from within a carrying case (see, e.g., optional enclosure 94) or may be placed on the surface of display 52 while device 10 is not within a carrying case.

Figure 7:
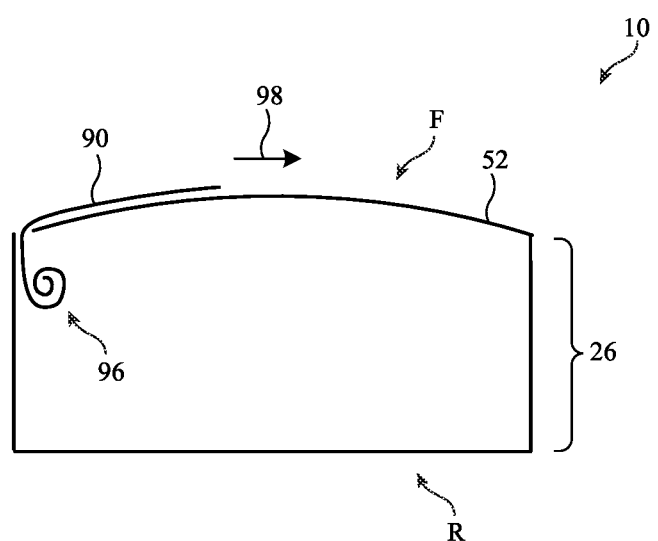
FIG. 7 is a top view of an illustrative electronic device with a cover that may be deployed by unrolling the cover in accordance with an embodiment.

If desired, cover 90 may be partly or fully stored within device 10 when not in use. This type of arrangement is shown in FIG. 7. As shown in the example of FIG. 7, cover 90 may be stored within interior region 42 of device 10 (e.g., in the interior of support structure 26) on a roll such as roll 96 when not in use. When it is desired to cover and protect the surface of display 52, cover 90 may be pulled across front face F of device 10 in direction 98, thereby covering display 52. A spring mechanism may be used to retract cover 90 onto roll 96 when it is desired to uncover display 52.

Figure 8:
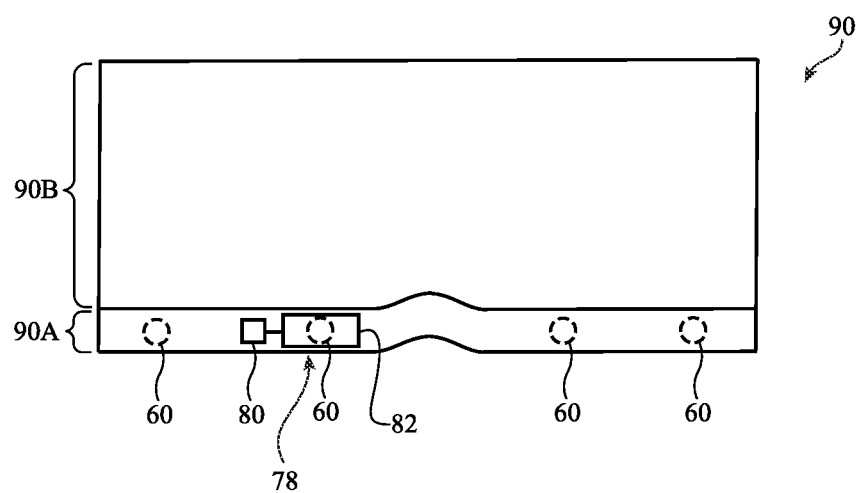
FIG. 8 is a front view of an illustrative electronic device with a removable cover attached over a display cover layer of a forward-facing display in accordance with an embodiment.

Cover 90 may have multiple portions each of which has a potentially different configuration (e.g., different materials, different structural sizes and shapes, different optical properties such as different amounts of light transmission, reflection, absorption, haze, color, etc.). Consider, as an example, cover 90 of FIG. 8. As shown in FIG. 8, cover 90 may have first portion 90A and a second portion 90B. Portion 90A may have an elongated strip shape that runs along the lower edge of cover 90 and that optionally extends around the entire periphery of cover 90. Portion 90A may, as an example, overlap inactive area IA and the optical components in inactive area IA (e.g., optical components 60 of FIG. 8). Portion 90B covers active area AA (and optionally other portions of display 52). The optical properties and/or other properties of portions 90A and 90B may be different.

In one illustrative example, portion 90A may be formed from a visible-light-blocking layer that is transparent to infrared light or that is opaque to infrared light, whereas portion 90B may be formed from a layer that is transparent to visible light (and transparent or opaque to infrared light). With this type of illustrative arrangement, the image displayed in the active area of display 52 will be visible through portion 90B, whereas the visible light blocking characteristics of portion 90A will hide components 60 from view. If desired, one or more of components 60 may be provided with shutter system such as shutter system 78 (e.g., a system with a movable shutter member such as member 82 and an actuator such as actuator 80). Shutter systems 78 may be formed in device 10 and/or may be formed in cover 90 (e.g., system 78 may be embedded within the polymer layer or other cover layer for cover 90). In scenarios in which portion 90A is transparent to infrared light, infrared cameras, infrared light-emitting didoes that provide illumination, and/or other infrared optical components 60 may be used (e.g., infrared light associated with the operation of these components may pass through portion 90A).

In another illustrative example, portion 90B is opaque, which prevents visible light from reaching the pixels P of display panel 52P and thereby helps protect display 52 from ambient light damage. Light from pixels P is also prevented from passing through portion 90B. Portion 90A in this type of configuration may be opaque at visible and/or infrared wavelengths (e.g., to protect components 60).

In arrangements in which visible light blocking material is provided in portion 90A, the visible light cameras of device 10 are blocked and the presence of the opaque material in portion 90A may be used to alert people in the vicinity of device 10 that the cameras are blocked. Logos, patterns, user-customized artwork, and/or other information may be included in cover 90, if desired. In arrangements in which an actuator and moving member are provided in cover 90, this system may be used to switch filters, ancillary lenses, and/or other optical components into and/or out of use in addition to or instead of being used to move shutter members into and out of alignment with overlapped optical components. A user may attach this type of cover 90 to device 10 to provide components 60 of device 10 with additional selectable optical capabilities (e.g., additional selectable lens elements, filtering, etc.).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a head-mounted support structure having opposing front and rear faces;
   left and right rear-facing displays configured to display images in eye boxes;
   a front-facing display on the front face, wherein the front facing display has a display panel configured to display an image and has a display cover layer that overlaps the display panel;
   an opaque masking layer on an inner surface of the display cover layer in an inactive border area of the front-facing display;
   an optical component at the inactive border area of the front-facing display that detects light that passes through the display cover layer through an opening in the opaque masking layer; and
   attachment structures configured to removably attach a protective cover over the front-facing display and the optical component, wherein the attachment structures comprise magnets disposed along the inactive border area of the front-facing display and overlapped by the opaque masking layer.

2. The head-mounted device defined in claim 1 further comprising:
   a shutter configured to selectively cover the optical component to prevent light from reaching the optical component.

3. The head-mounted device defined in claim 2, wherein the shutter has an actuator and a movable shutter member that is movable by the actuator between a first position in which the movable shutter member does not cover the optical component and a second position in which the movable shutter member covers the optical component.

4. The head-mounted device defined in claim 2, wherein the shutter comprises an electrically adjustable shutter.

5. The head-mounted device defined in claim 1 further comprising:
   an optical filter configured to selectively cover the optical component to filter light before the filtered light reaches the optical component.

6. The head-mounted device defined in claim 1 further comprising:
   an ancillary lens configured to selectively cover the optical component to adjust a lens power for the optical component.

7. A head-mounted device, comprising:
   a head-mounted support structure having a rear face and an opposing front face;
   rear-facing displays that are supported by the head-mounted support structure and that are configured to provide images viewable from eye boxes;
   a front-facing display on the front face, wherein the front-facing display has an array of pixels and a display cover layer that overlaps the array of pixels;
   an optical component configured to operate through the display cover layer; and
   attachment structures configured to hold a protective cover over the front-facing display and the optical component, wherein the protective cover includes a movable member that is movable between a first position that does not overlap the optical component when the protective cover is held over the optical component and a second position that overlaps the optical component when the protective cover is held over the optical component.

8. The head-mounted device defined in claim 7, wherein the movable member comprises a movable shutter member configured to prevent light from reaching the optical component when the movable member is in the second position.

9. The head-mounted device defined in claim 7, wherein the movable member comprises an optical filter that is configured to filter light before the filtered light reaches the optical component when the movable member is in the second position.

10. The head-mounted device defined in claim 7, wherein the movable member comprises an ancillary lens that adjusts a lens power for the optical component when the movable member is in the second position.

11. The head-mounted device defined in claim 7, wherein the protective cover includes an actuator coupled to the movable member.

12. The head-mounted device defined in claim 7, wherein the protective cover has a visible-light-blocking portion and a visible-light-transparent portion.

13. A head-mounted device, comprising:
   a head-mounted support structure having opposing front and rear faces;
   left and right rear-facing displays configured to display images in eye boxes;
   a front-facing display on the front face, wherein the front facing display has a display panel configured to display an image and has a display cover layer that overlaps the display panel;
   an opaque masking layer on an inner surface of the display cover layer in an inactive border area of the front-facing display;
   an optical component at the inactive border area of the front-facing display that detects light that passes through the display cover layer through an opening in the opaque masking layer;
   an ancillary lens configured to selectively cover the optical component to adjust a lens power for the optical component; and
   attachment structures configured to removably attach a protective cover over the front-facing display and the optical component.

14. The head-mounted device defined in claim 1, wherein the protective cover has a visible-light-blocking portion and a visible-light-transparent portion.

15. The head-mounted device defined in claim 14, wherein the visible-light-blocking portion overlaps the inactive border area of the front-facing display and wherein the visible-light-transparent portion overlaps an active area of the front-facing display that displays the image.

16. The head-mounted device defined in claim 1, wherein the opaque masking layer has portions on opposing sides of the opening.

* * * * *